US012586747B2

(12) United States Patent
Ishikawa

(10) Patent No.: US 12,586,747 B2
(45) Date of Patent: Mar. 24, 2026

(54) EMITTER AND DEVICE COMPRISING SAME

(71) Applicant: Denka Company Limited, Tokyo (JP)

(72) Inventor: Daisuke Ishikawa, Tokyo (JP)

(73) Assignee: Denka Company Limited, Tokyo (JP)

( * ) Notice: Subject to any disclaimer, the term of this patent is extended or adjusted under 35 U.S.C. 154(b) by 0 days.

(21) Appl. No.: 18/851,047

(22) PCT Filed: Mar. 20, 2023

(86) PCT No.: PCT/JP2023/010963

§ 371 (c)(1),
(2) Date: Sep. 25, 2024

(87) PCT Pub. No.: WO2023/189842

PCT Pub. Date: Oct. 5, 2023

(65) Prior Publication Data

US 2025/0218717 A1 Jul. 3, 2025

(30) Foreign Application Priority Data

Mar. 29, 2022 (JP) ................................ 2022-053162

(51) Int. Cl.
*H01J 37/06* (2006.01)
*H01J 1/22* (2006.01)
*H01J 1/90* (2006.01)

(52) U.S. Cl.
CPC ................. *H01J 1/90* (2013.01); *H01J 1/22* (2013.01); *H01J 2201/2896* (2013.01)

(58) Field of Classification Search
CPC ......... H01J 1/90; H01J 1/22; H01J 2201/2896
See application file for complete search history.

(56) References Cited

U.S. PATENT DOCUMENTS

| | | | |
|---|---|---|---|
| 5,854,490 | A | 12/1998 | Ooaeh et al. |
| 2010/0301736 | A1 | 12/2010 | Morishita et al. |
| 2023/0298846 | A1 | 9/2023 | Ishikawa et al. |

FOREIGN PATENT DOCUMENTS

| | | | |
|---|---|---|---|
| JP | S47-025911 | | 7/1972 |
| JP | H09-260237 | A | 10/1997 |
| JP | 2003-168382 | A | 6/2003 |
| JP | 2008-166265 | A | 7/2008 |
| WO | 2022/039042 | A1 | 2/2022 |

OTHER PUBLICATIONS

International Search Report dated May 16, 2023, mailed in counterpart International Application No. PCT/JP2023/010963, 2 pages.

(Continued)

*Primary Examiner* — Elmito Breval
(74) *Attorney, Agent, or Firm* — Kim & Stewart LLP

(57) ABSTRACT

An emitter includes: an insulator; a pair of conductive terminals attached to the insulator and spaced apart from each other; a heater disposed between tips of the pair of conductive terminals and generating heat when energized; an electron source heated by the heater and made of a first material emitting electrons; a Wehnelt electrode having an inner surface forming an internal space along with a surface of the insulator, and applying a bias voltage across the Wehnelt electrode and the electron source; and a shielding member covering a part of the surface of the insulator in the internal space.

8 Claims, 12 Drawing Sheets

(56) References Cited

OTHER PUBLICATIONS

International Preliminary Report on Patentability dated Oct. 10, 2024, mailed in counterpart International Application No. PCT/JP2023/010963, 6 pages.
Extended European Search Report mailed May 27, 2025 in corresponding European Patent Application No. 23779858.2, 8 pages.

(a)

(b)

(a)

(b)

(a)

(b)

(a)

(b)

(a)

(b)

(a)

(b)

EMITTER AND DEVICE COMPRISING SAME

TECHNICAL FIELD

The disclosure relates to an emitter that emits electrons and a device comprising the same.

BACKGROUND ART

Emitters that emit electrons are used, for example, in electron microscopes and semiconductor inspection equipment. The emitter includes an electron source and a heater for heating the electron source, and an emission current is obtained by heating the electron source by energizing the heater. Patent Literature 1 discloses a thermionic cathode device including an emitter tip, a heat-generating holder for holding the emitter tip, and a conductive member for supporting the heat-generating holder and supplying a current thereto. The heat-generating holder is made of a pyrolytic graphite material. According to lines 2 to 14 in the right column on page 1 and FIG. 1 of Patent Literature 1, when an emitter tip 11 is heated, electrons are emitted from an opening 12 of a Wehnelt cylinder 13. By controlling the voltage applied across the Wehnelt cylinder 13 and the emitter tip 11, the flow of electrons from the emitter tip 11 can be aligned.

CITATION LIST

Patent Literature

[Patent Literature 1] JP-B-47-25911

SUMMARY OF INVENTION

Technical Problem

The heater and the electron source may be heated to 1600 to 1900K by energizing the heater. Under high-temperature conditions, the materials that make up the heater and/or electron source may evaporate, thereby producing evaporated matter. When this evaporated matter cools and solidifies, for example, on the surface of an insulator, the insulating properties of the insulator surface deteriorate, causing unintended current flow. This current causes a problem in that the reliability of the emission current is impaired.

The disclosure provides an emitter capable of maintaining the reliability of an emission current for a sufficiently long period of time and a device including the same.

Solution to Problem

An aspect of the disclosure relates to an emitter. This emitter includes: an insulator; a pair of conductive terminals attached to the insulator and spaced apart from each other; a heater disposed between tips of the pair of conductive terminals and generating heat when energized; an electron source heated by the heater and made of a first material emitting electrons; a Wehnelt electrode having an inner surface forming an internal space along with a surface of the insulator, and applying a bias voltage across the Wehnelt electrode and the electron source; and a shielding member covering a part of the surface of the insulator in the internal space.

The shielding member preferably serves to suppress a conductive layer from being formed continuously between the conductive terminal and the Wehnelt electrode due to solidification of evaporated matter on the surface of the insulator. The evaporated matter is generated in the internal space by heat from the heater. Since a relatively large voltage (for example, 15 to 1000 V) is applied across the conductive terminal and the Wehnelt electrode, it is preferable that a high level of insulation between the conductive terminal and the Wehnelt electrode is maintained. On the other hand, since the voltage applied across the pair of conductive terminals is, for example, about 1 to 10 V, the insulation required between the pair of conductive terminals is not as high compared to the insulation required between the conductive terminals and the Wehnelt electrode.

The shielding member is preferably spaced apart from the inner surface of the Wehnelt electrode. For example, the shielding member is preferably disposed to cover at least a region along the inner surface of the Wehnelt electrode, of the surface of the insulator. The shielding member is preferably spaced apart from the pair of conductive terminals. For example, the shielding member may be disposed to cover at least two regions respectively along the pair of conductive terminals, of the surface of the insulator.

The emitter may further include an intermediate member made of a second material having a lower thermal conductivity than the first material, and the tips of the pair of conductive terminals may hold the electron source via the intermediate member. By disposing the intermediate member (second material) having a lower thermal conductivity than the electron source (first material) between the electron source and the heater, it is possible to operate the heater at a higher temperature compared to when no intermediate member is provided. Accordingly, it is possible to suppress the material constituting the electron source from being evaporated near the heater and thereby suppress the performance degradation of the emitter. This is based on the concept of suppressing the heater from efficiently heating the electron source to some extent and using excess heat from the heater to suppress the deposition of the material that constitutes the electron source near the heater (for example, the tip of the conductive terminal). By combining this concept with the concept of maintaining the insulation of the insulator surface by using the shielding member, excellent reliability of the emission current can be maintained for a longer period of time.

An aspect of the disclosure relates to a device comprising the emitter. Examples of the devices comprising the emitters include electron microscopes, semiconductor manufacturing devices, inspection devices, and processing devices.

Advantageous Effects of Invention

According to the disclosure, there are provided an emitter capable of maintaining the reliability of an emission current for a sufficiently long period of time and a device including the same.

Figure 3:
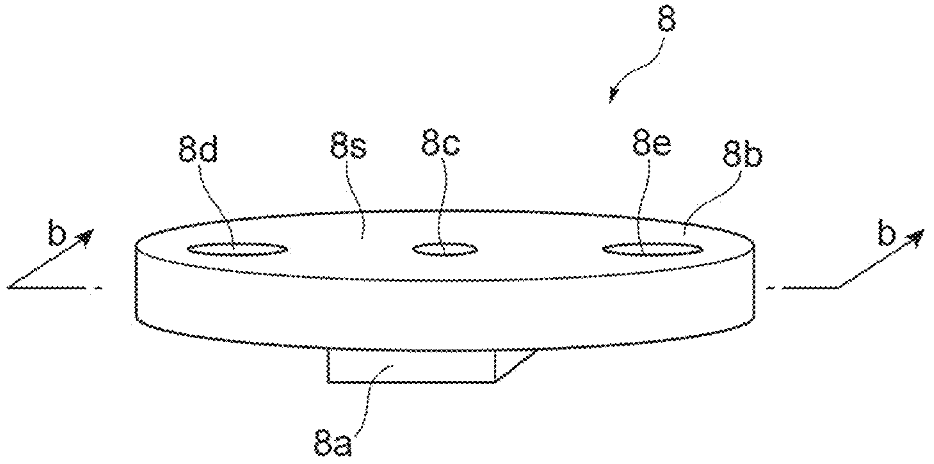
Figure 3:
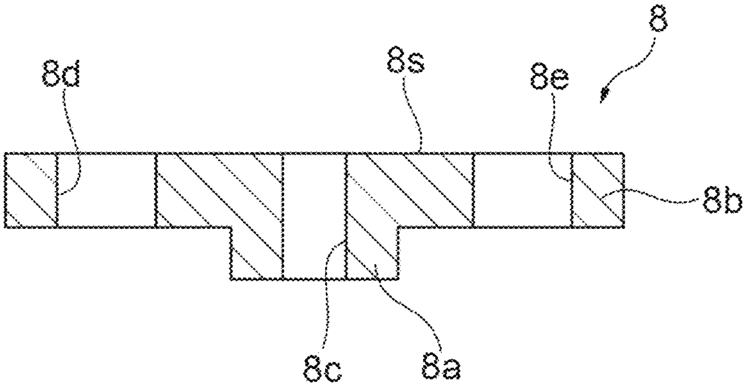

(a) in FIG. 3 is a perspective view schematically showing an example of a shielding member and (b) in FIG. 3 is a cross-sectional view taken along a line b-b shown in (a) in FIG. 3.

Figure 4:
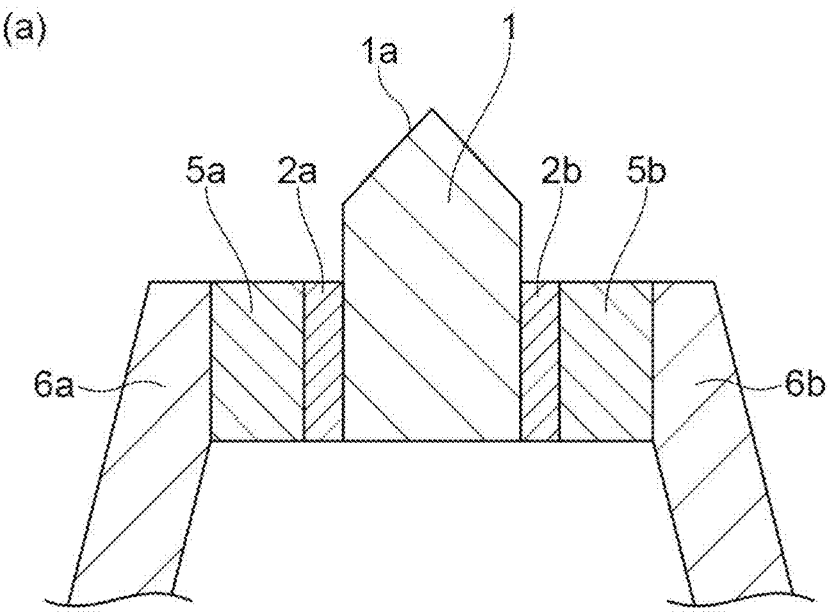
Figure 4:
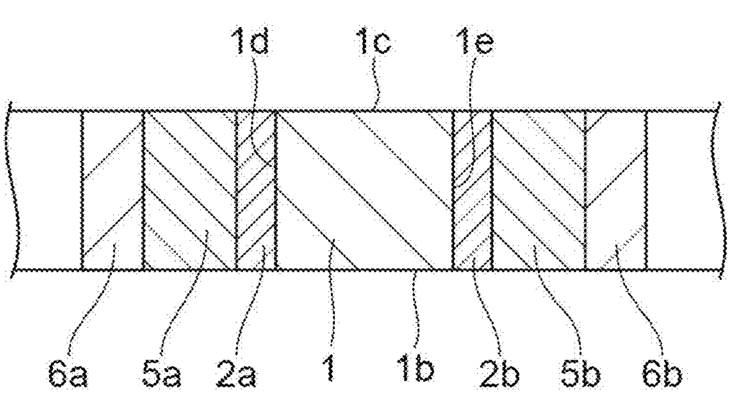

(a) in FIG. 4 is a vertical cross-sectional view schematically showing the configuration of an electron source and other related parts disposed between the tips of a pair of conductive terminals and (b) in FIG. 4 is a horizontal cross-sectional view of the configuration shown in (a) in FIG. 4.

Figure 1:
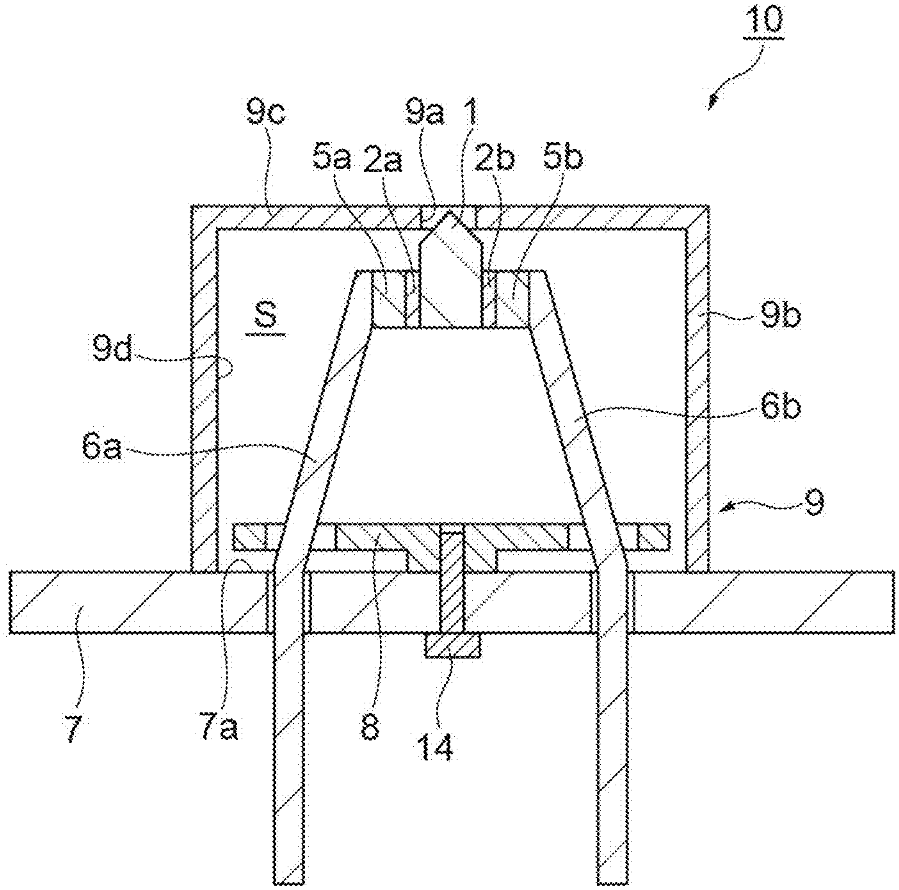
FIG. 1 is a vertical cross-sectional view schematically showing an embodiment of an emitter according to the disclosure.
Figure 5:
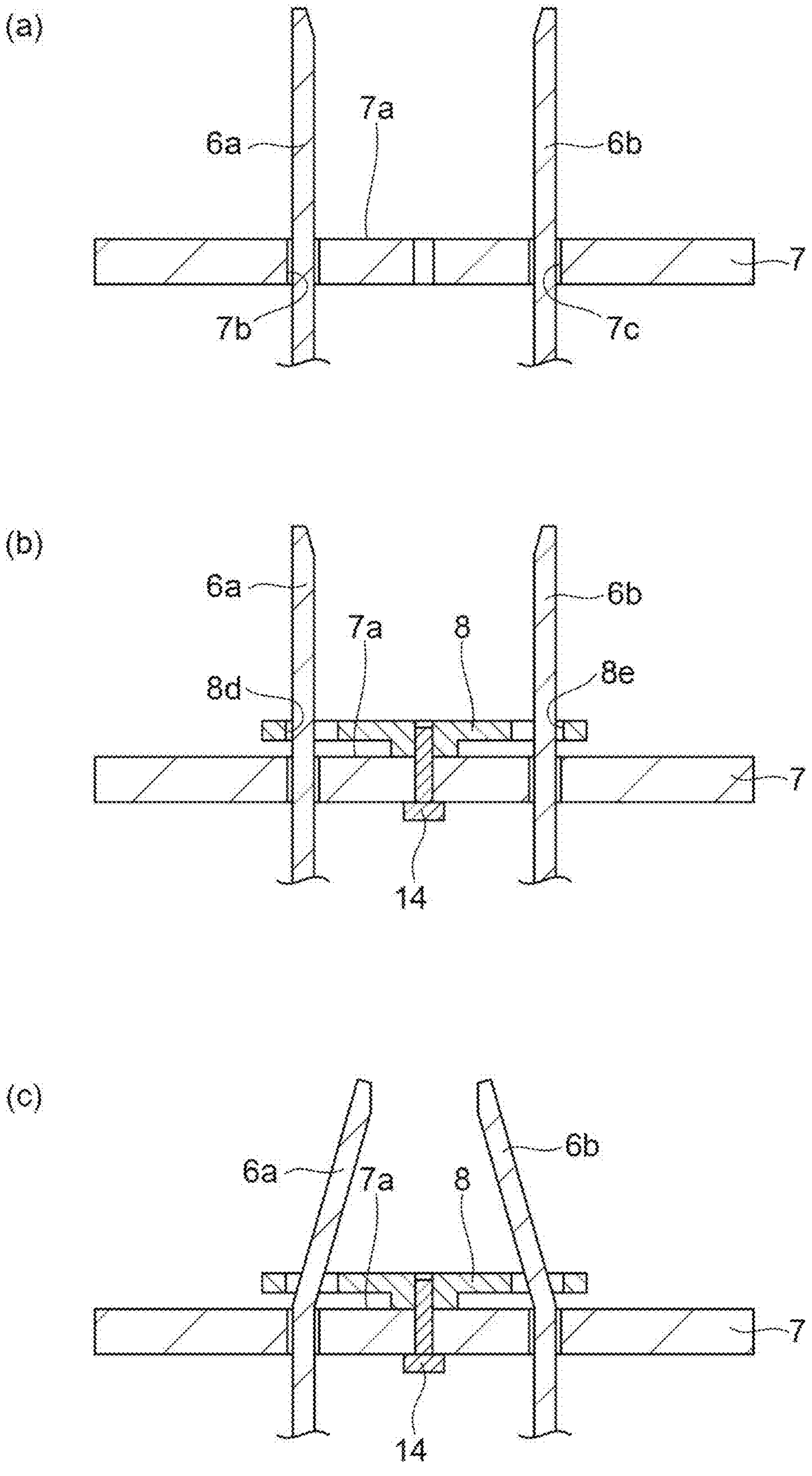

(a) to (c) in FIG. 5 are cross-sectional views schematically showing a process of manufacturing the emitter shown in FIG. 1.

Figure 6:
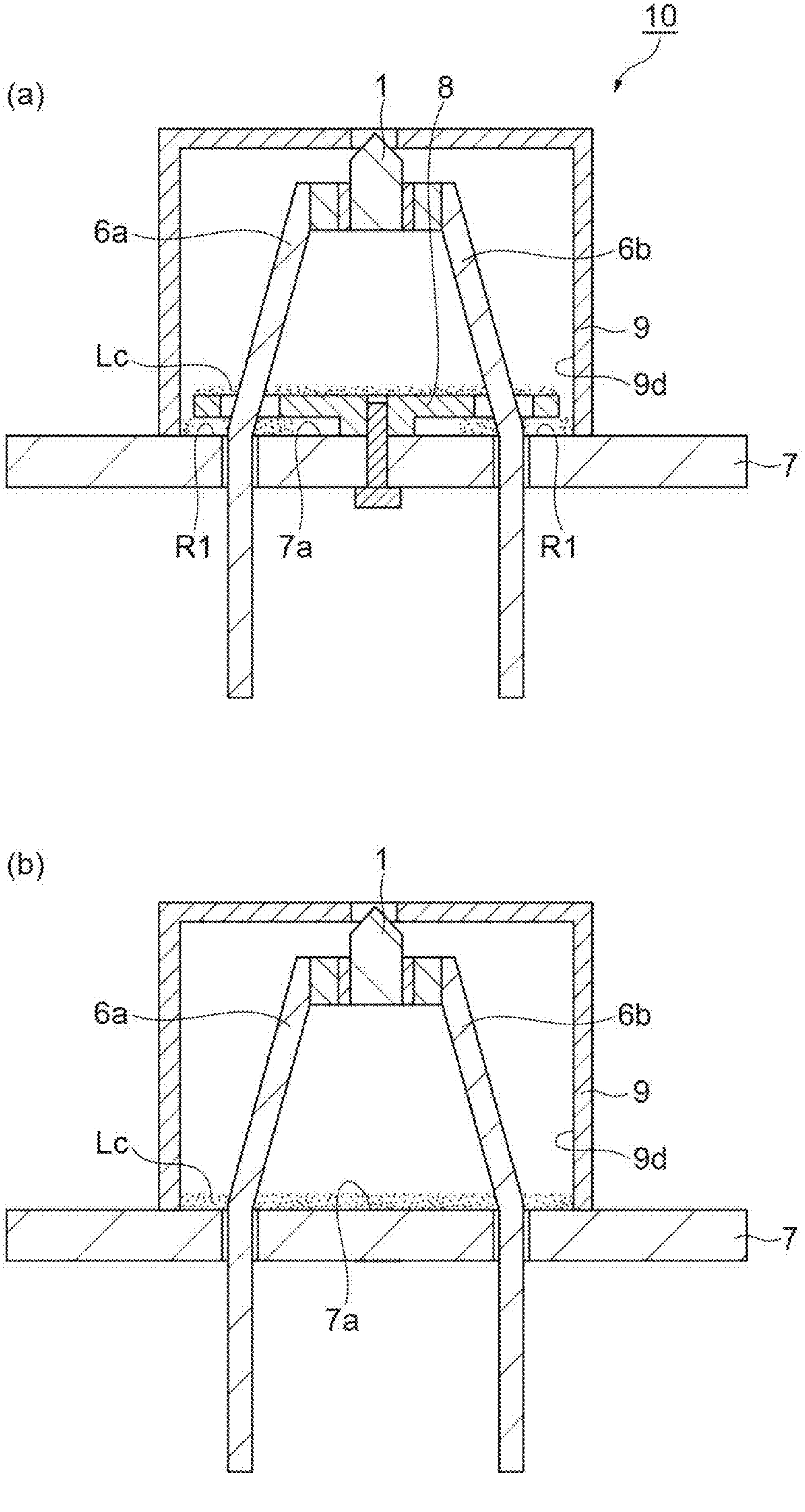

(a) in FIG. 6 is a cross-sectional view schematically showing a state after the emitter shown in FIG. 1 is used for a long period of time and (b) in FIG. 6 is a cross-sectional view schematically showing a state after an emitter without a shielding member is used for a long period of time.

Figure 7:
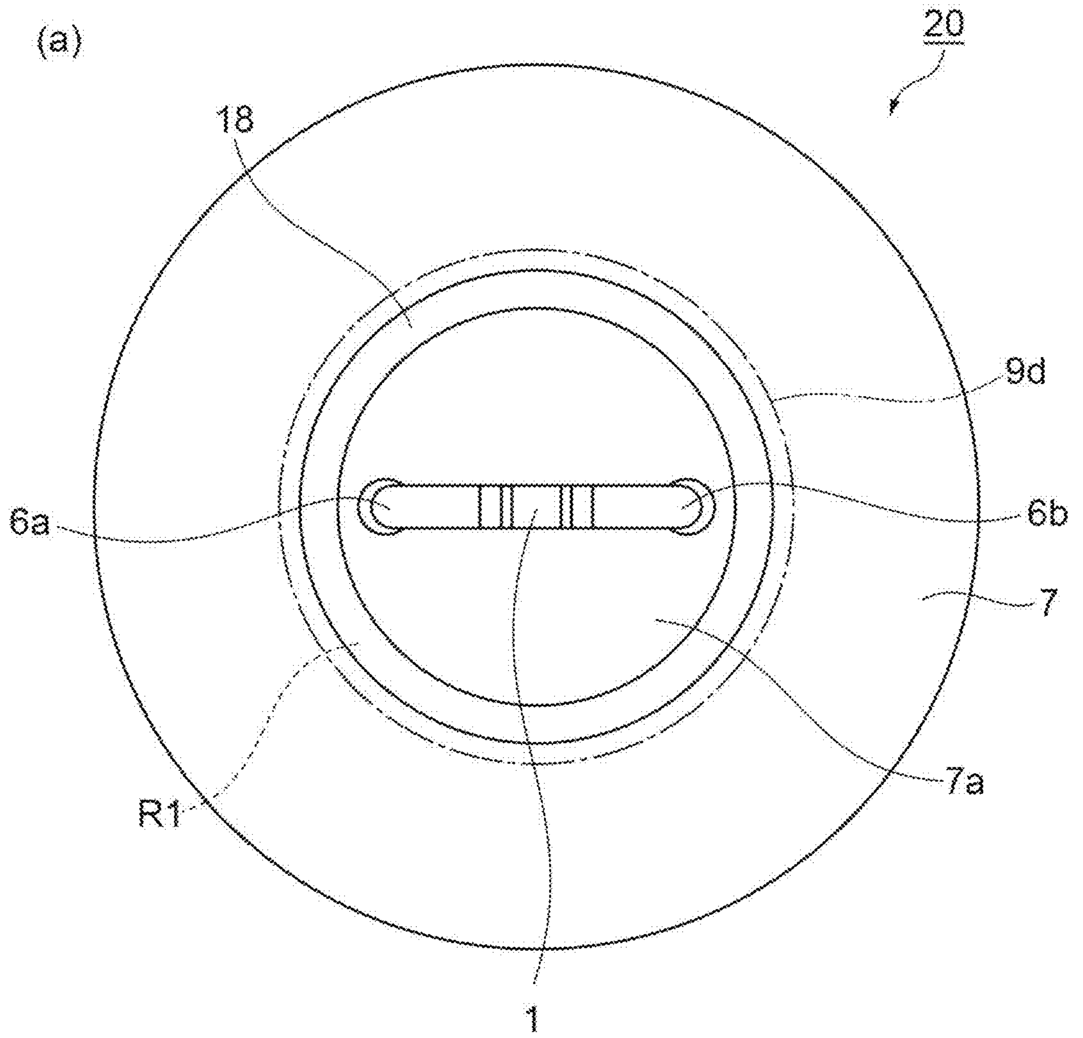
Figure 7:
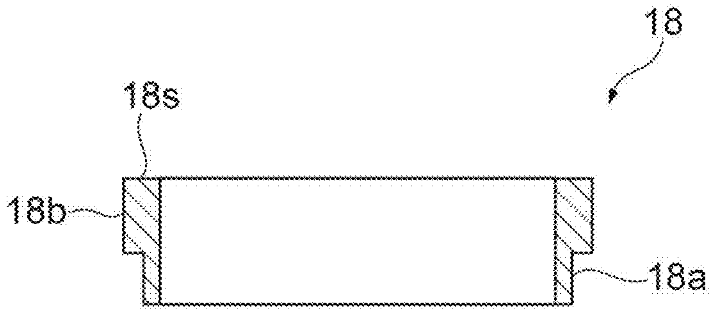

(a) in FIG. 7 is a plan view schematically showing an emitter with a shielding member according to another example and (b) in FIG. 7 is a cross-sectional view of the shielding member shown in (a) in FIG. 7.

Figure 8:
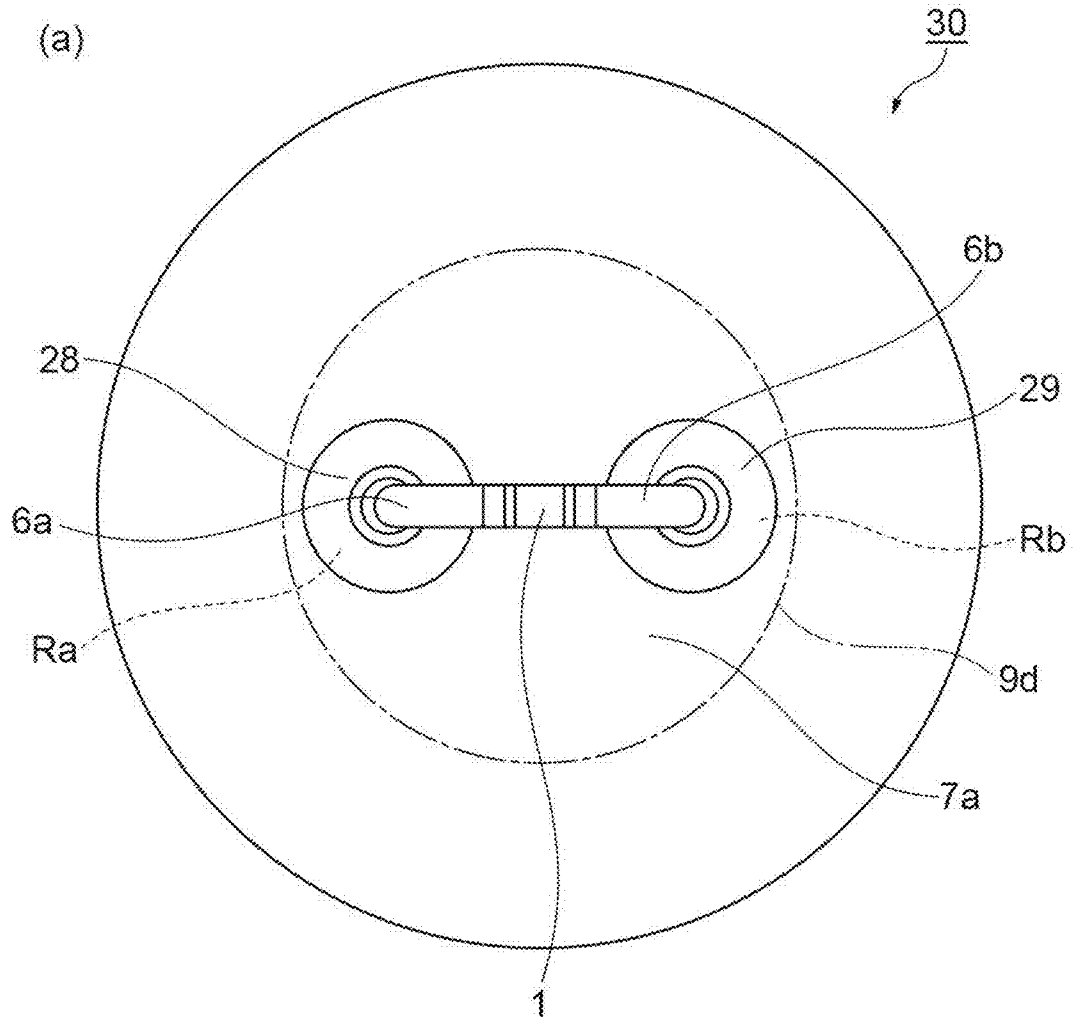
Figure 8:
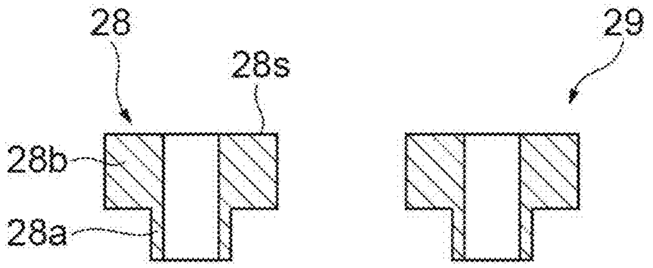

(a) in FIG. 8 is a plan view schematically showing an emitter with a shielding member according to another example and (b) in FIG. 8 is a cross-sectional view of the shielding member shown in (a) in FIG. 8.

Figure 9:
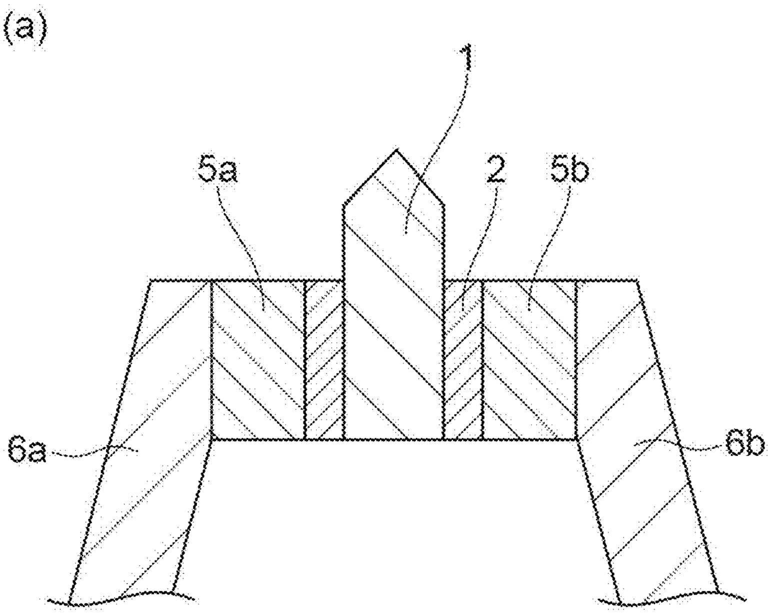
Figure 9:
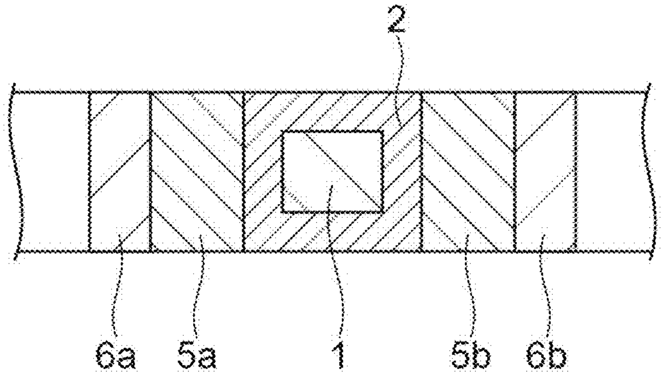

(a) in FIG. 9 is a vertical cross-sectional view schematically showing another configuration of an electron source and the like disposed between tips of a pair of conductive terminals and (b) in FIG. 9 is a horizontal cross-sectional view of the configuration shown in (a) in FIG. 9.

Figure 10:
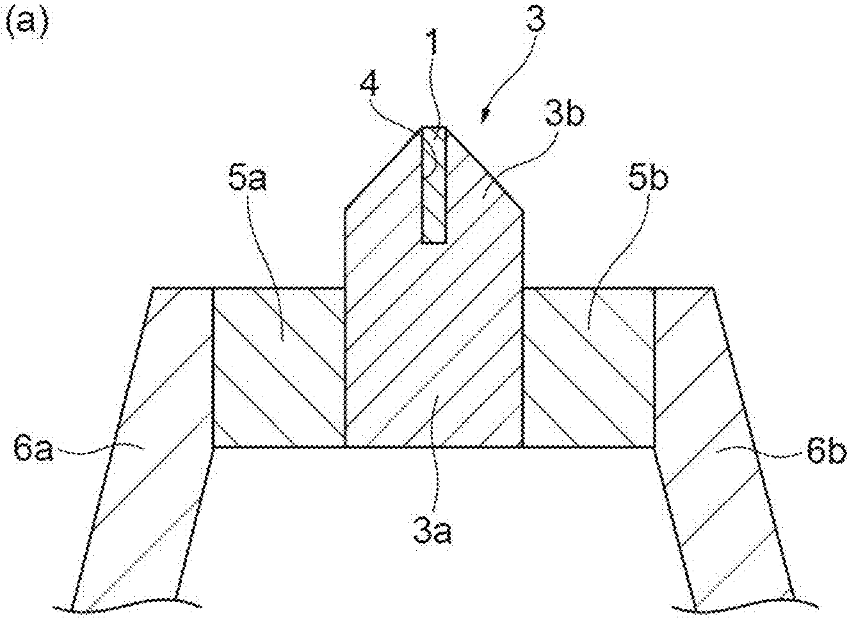
Figure 10:
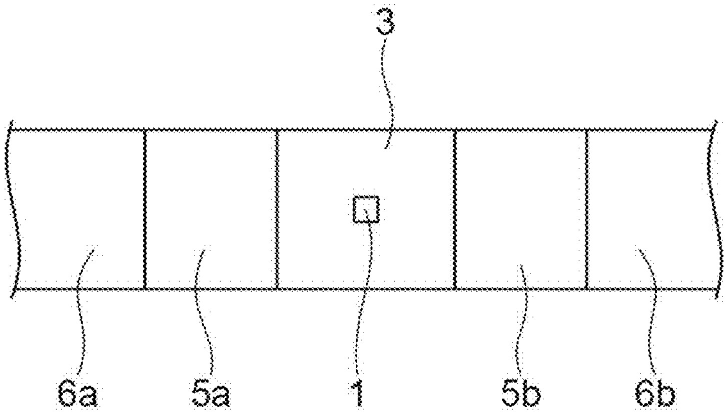

(a) in FIG. 10 is a vertical cross-sectional view schematically showing another configuration of an electron source and the like disposed between tips of a pair of conductive terminals and (b) in FIG. 10 is a plan view of the configuration shown in (a) in FIG. 10.

Figure 11:
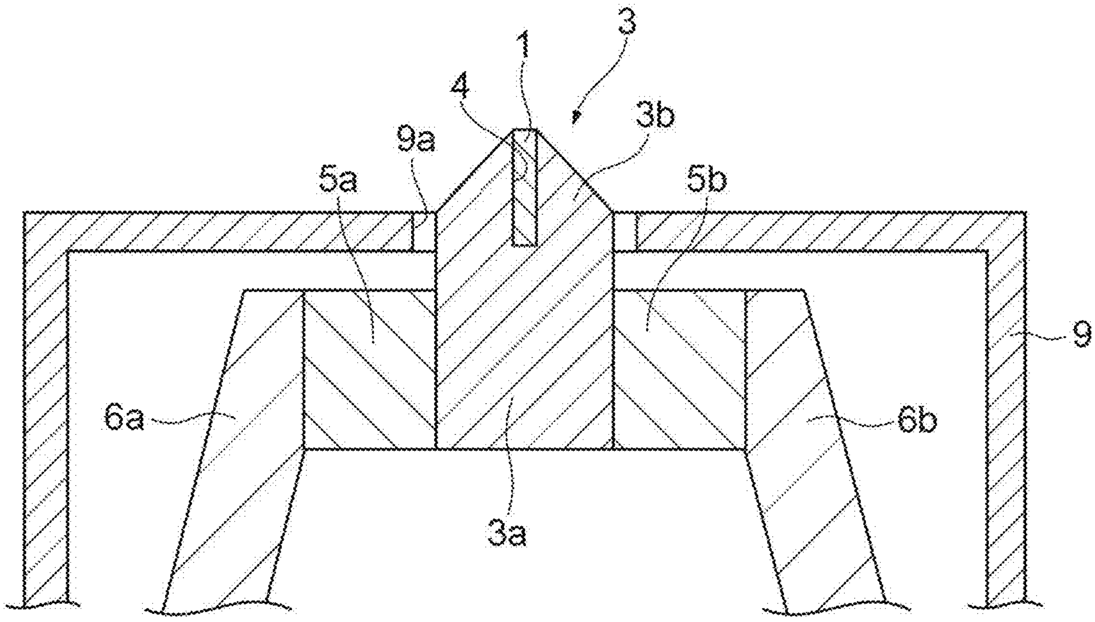

FIG. 11 is a vertical cross-sectional view schematically showing another embodiment of the emitter according to the disclosure.

Figure 12:
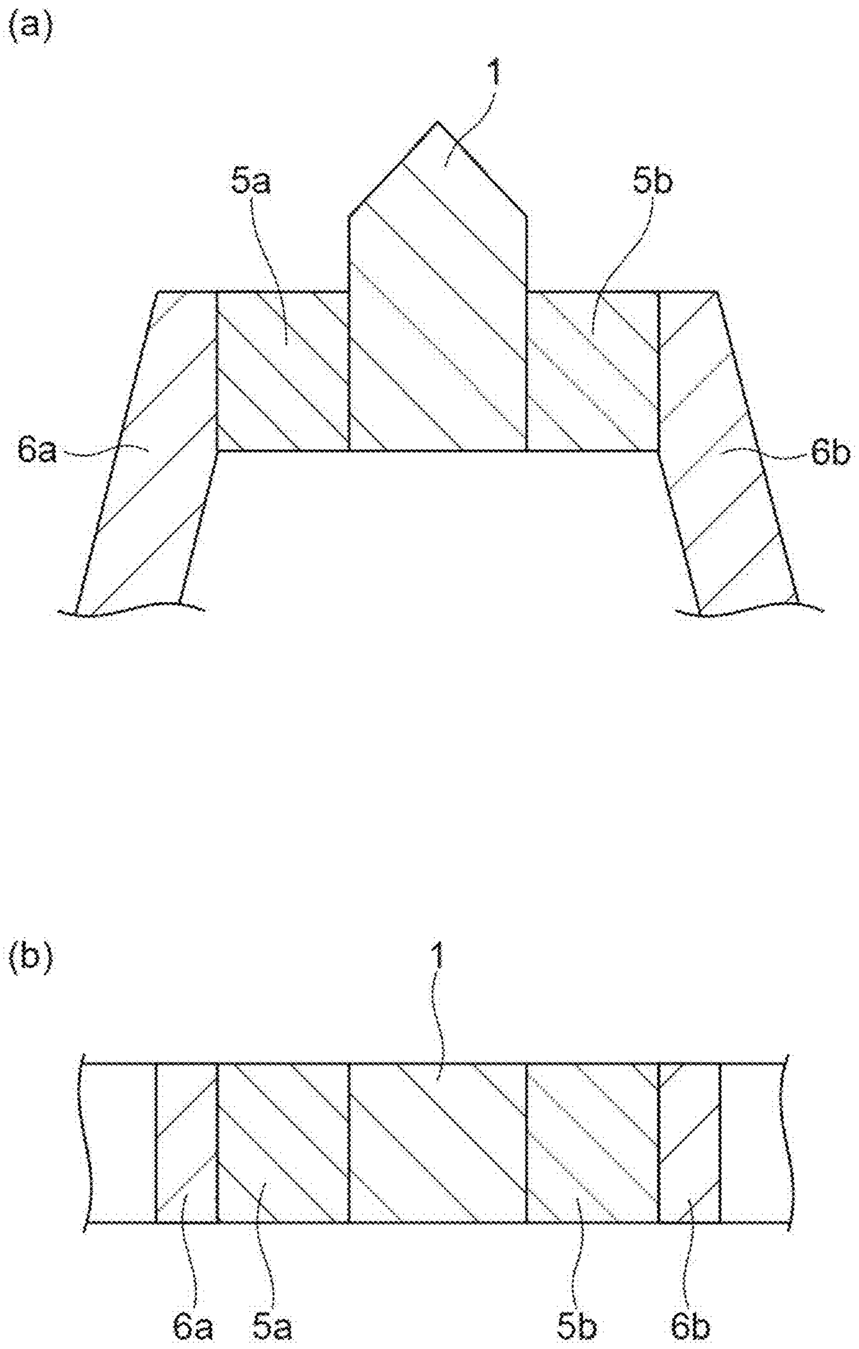

(a) in FIG. 12 is a vertical cross-sectional view schematically showing another configuration of an electron source and the like disposed between tips of a pair of conductive terminals and (b) in FIG. 12 is a horizontal cross-sectional view of the configuration shown in (a) in FIG. 12.

DESCRIPTION OF EMBODIMENTS

Hereinafter, embodiments of the disclosure will be described with reference to the drawings. In the following description, the same components or components having the same functions are designated by the same reference numerals, and duplicated descriptions are omitted. Furthermore, the disclosure is not limited to the following embodiments.

<Emitter>

FIG. 1 is a vertical cross-sectional view schematically showing an emitter according to this embodiment. An emitter 10 shown in this drawing includes an electron source 1, intermediate members 2*a* and 2*b*, a pair of heaters 5*a* and 5*b*, a pair of conductive terminals 6*a* and 6*b*, an insulator 7, a shielding member 8, and a Wehnelt electrode 9. When the heaters 5*a* and 5*b* generate heat due to energization thereto, the electron source 1 is heated and electrons emitted from the electron source 1 are emitted from an opening 9*a* of the Wehnelt electrode 9. The tip of the electron source 1 is located at a position that does not protrude from the opening 9*a*. The Wehnelt electrode 9 is an electrode disposed between the electron source 1 (cathode) and the anode (not shown), is configured to apply a negative bias voltage to the electron source 1, and serves to control the amount of emitted electrons. With this configuration, it is possible to suppress excess electrons from the side surface of the electron source 1 and to use only the electrons from the tip of the electron source 1. The Wehnelt electrode 9 includes a cylindrical portion 9*b* and a closing portion 9*c* which closes one end of the cylindrical portion 9*b* and has an opening 9*a* formed at the center of the closing portion 9*c*. An inner surface 9*d* of the Wehnelt electrode 9 forms an internal space S along with a surface 7*a* of the insulator 7. In order to heat the electron source 1, a voltage of, for example, about 1 to 10 V is applied between the pair of conductive terminals 6*a* and 6*b*, and a current of about 0.5 to 3 A flows. Examples of devices including the emitter 10 include electron microscopes, semiconductor manufacturing devices, inspection devices, and processing devices.

Figure 2:
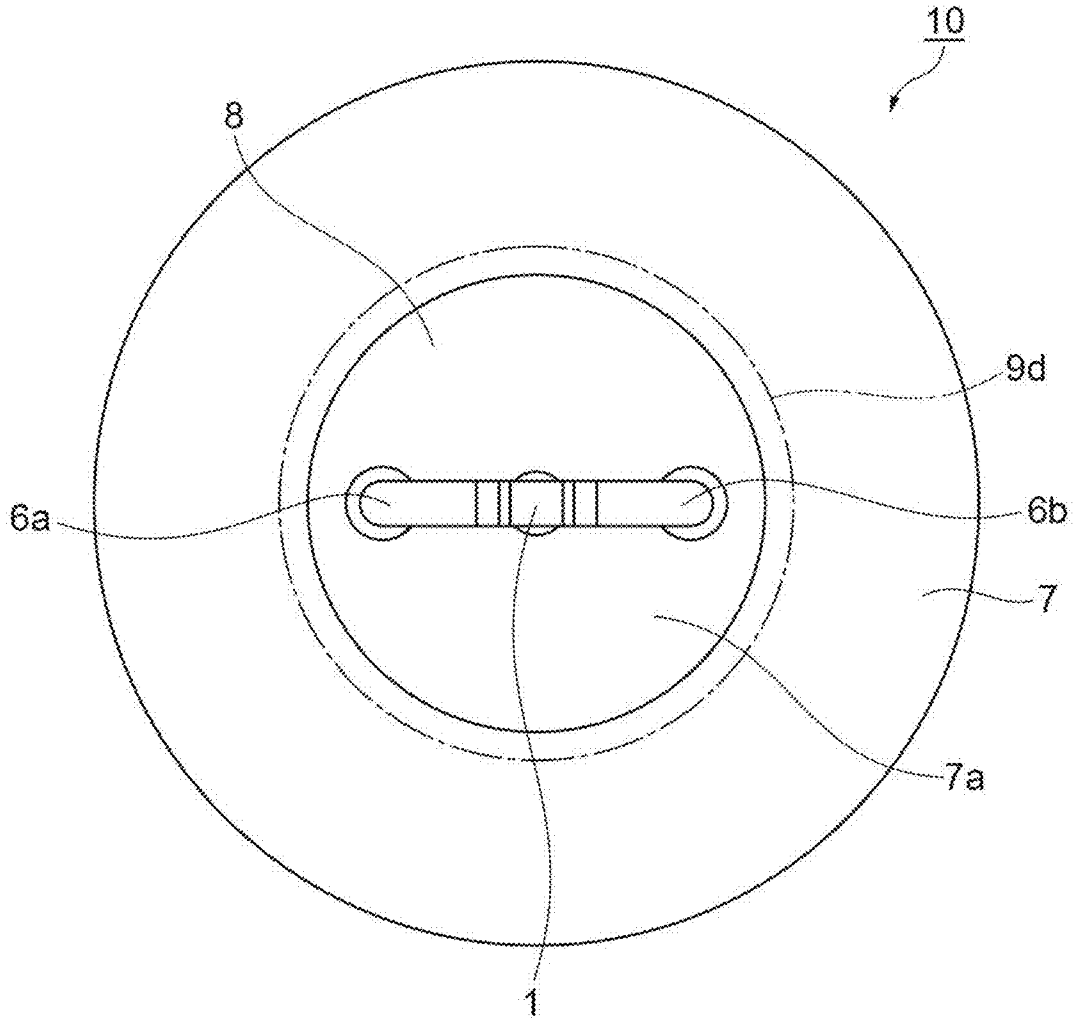
FIG. 2 is a plan view schematically showing a state in which a Wehnelt electrode is removed from the emitter shown in FIG. 1.

FIG. 2 is a plan view schematically showing a state in which the Wehnelt electrode 9 is removed from the emitter 10 shown in FIG. 1. The dashed circle in FIG. 2 indicates the position of the inner surface 9*d* of the Wehnelt electrode 9. As shown in FIGS. 1 and 2, the shielding member 8 is disposed on the surface 7*a* of the insulator 7. The shielding member 8 serves to suppress a conductive layer Lc (a conductive deposition layer) from being formed continuously between the conductive terminals 6*a* and 6*b* and the Wehnelt electrode 9 due to the solidification of evaporated matter on the surface 7*a* of the insulator 7, which is generated in the internal space S by heat from the heaters 5*a* and 5*b* (see (a) in FIG. 6). Since a voltage of, for example, 15 to 1000 V is applied between the conductive terminals 6*a* and 6*b* and the Wehnelt electrode 9, it is preferable that a high level of insulation between the conductive terminals 6*a* and 6*b* and the Wehnelt electrode 9 is maintained.

As shown in (a) and (b) in FIG. 3, the shielding member 8 according to this embodiment is composed of a raised portion 8*a* which comes into contact with the surface 7*a* of the insulator 7 and a protruding portion 8*b* which has a surface 8*s* exposed to the internal space S. The raised portion 8*a* has a rectangular cross section. The length of one side is, for example, about 4 to 10 mm. The thickness of the raised portion 8*a* is, for example, 0.5 to 2 mm. In a plan view, the protruding portion 8*b* is provided to protrude laterally beyond the raised portion 8*a*, and is circular in cross section. The diameter is, for example, about 8 to 20 mm.

The shielding member 8 is made of an insulating material (for example, ceramics). From the viewpoint of workability, the material of the shielding member 8 is preferably a machinable ceramic. The raised portion 8*a* and the protruding portion 8*b* may be formed integrally, or may be separable from each other. The shielding member 8 includes a hole 8*c* for fixing the shielding member 8 to the insulator 7 with a bolt 14 and holes 8*d* and 8*e* into which the conductive terminals 6*a* and 6*b* are inserted. The bolt hole 8*c* is provided to penetrate the center of the shielding member 8, and the holes 8*d* and 8*e* are provided at positions that sandwich the hole 8*c*.

(a) in FIG. 4 is a vertical cross-sectional view schematically showing a configuration of the electron source 1 and the like accommodated in the internal space S, and (b) in FIG. 4 is a horizontal cross-sectional view shown in (a) in FIG. 4. As shown in these drawings, the electron source 1 is disposed between the tips of the conductive terminals 6*a* and 6*b*. The conductive terminals 6*a* and 6*b* are used to hold the electron source 1 and to energize the heaters 5*a* and 5*b*. The electron source 1 is sandwiched by the intermediate members 2*a* and 2*b*. The heaters 5*a* and 5*b* are disposed on the outside of the intermediate members 2*a* and 2*b*. The tip of the conductive terminal 6*a* is in contact with the heater 5*a*, and the tip of the conductive terminal 6*b* is in contact with the heater 5*b*.

The electron source 1 is made of a first material (electron emitting material) having electron emitting properties. The tip 1*a* of the electron source 1 is formed in a cone shape, and electrons are emitted from the tip. In this embodiment, the side surfaces 1*b* and 1*c* of the electron source 1 are exposed to the internal space S.

In this embodiment, the shape of the electron source 1 other than the tip 1*a* is a square prism. The length of the electron source 1 is, for example, 0.1 to 2 mm, and may be 0.2 to 1.5 mm or 0.2 to 1 mm. The length of 0.1 mm or more tends to improve handling, and the length of 2 mm or less tends to improve uniform heating. The cross-sectional shape of the square prism of the electron source 1 is approximately square. The length of the side is, for example, 0.02 to 1 mm, and may be 0.05 to 0.5 mm or 0.05 to 0.15 mm.

Examples of electron emitting materials include rare earth borides such as lanthanum boride ($LaB_6$) and cerium boride ($CeB_6$); high melting point metals such as tungsten, tantalum, and hafnium as well as their oxides, carbides, and nitrides; and precious metal-rare earth alloys such as iridium cerium.

From the viewpoints of electron emission characteristics, strength, and workability, the electron emitting material constituting the electron source 1 is preferably a rare earth boride. When the electron source 1 is made of a rare earth boride, it is preferable that the electron source 1 is a single crystal processed so that the <100> orientation, which is easy to emit electrons, coincides with the electron emission direction. The electron source 1 can be formed into a desired shape by electric discharge machining and the like. The side surface of the electron source 1 is preferably a (100) crystal plane since it is thought that the evaporation rate becomes slower on this side surface.

The material constituting the electron source 1 has a higher thermal conductivity than the material constituting the intermediate members 2*a* and 2*b*. The thermal conductivity of the material constituting the electron source 1 is preferably 5 W/m·K or more, and more preferably 10 W/m·K or more. Since the thermal conductivity of this material is 5 W/m·K or more, the entire electron source 1 tends to be heated sufficiently uniformly by the heat from the heaters 5*a* and 5*b*. Furthermore, the upper limit of the thermal conductivity of this material is, for example, 200 W/m·K. The thermal conductivities of a plurality of materials are shown below.

Lanthanum boride ($LaB_6$): 60 W/m·K
Tungsten: 177 W/m·K

It is preferable that the thermal conductivity value $T_E$ of the electron source 1 is sufficiently larger than the thermal conductivity value $T_I$ of the intermediate members 2*a* and 2*b*. The ratio ($T_E/T_I$) of the thermal conductivity value $T_E$ of the electron source 1 to the thermal conductivity value $T_I$ of the intermediate members 2*a* and 2*b* is, for example, 7 to 13, and may be 8 to 12 or 10 to 11. By setting this ratio within this range, the temperature of the heaters 5*a* and 5*b* can be appropriately increased when energized. The temperature of the heaters 5*a* and 5*b* during energization can be set to be, for example, about 150 to 250° C. higher than the temperature of the electron source 1. Accordingly, it is possible to suppress the material constituting the electron source 1 from being deposited in the vicinity of the heaters 5*a* and 5*b*.

The intermediate members 2*a* and 2*b* are disposed to contact and cover a pair of surfaces 1*d* and 1*e* of the electron source 1 (see (b) in FIG. 4). It is preferable that the length of the shortest path of the intermediate member from the heater to the electron source is 100 μm or more. That is, in this embodiment, the thickness of the intermediate member 2*a* (the distance between the electron source 1 and the heater 5*a*) is preferably 100 μm or more, and may be 100 to 1000 μm or 300 to 800 μm.

The intermediate members 2*a* and 2*b* are made of a material (second material) having a lower thermal conductivity than the material constituting the electron source 1. The thermal conductivity of the material constituting the intermediate members 2*a* and 2*b* is, for example, 100 W/m·K or less, preferably 1 to 100 W/m·K, and more preferably 1 to 60 W/m·K. The lower limit of this value may be 2 W/m·K or may be 3 W/m·K. The upper limit of this value may be 45 W/m·K, or may be 40 W/m·K. When the thermal conductivity of this material is 1 W/m·K or more, heat from the heaters 5*a* and 5*b* tends to be sufficiently transmitted to the electron source 1, whereas when the thermal conductivity is 100 W/m·K or less, a sufficient temperature difference tends to be generated between the heaters 5*a* and 5*b* and the electron source 1.

The material constituting the intermediate members 2*a* and 2*b* preferably includes a high melting point metal or a carbide thereof, and preferably includes at least one of metallic tantalum, metallic titanium, metallic zirconium, metallic tungsten, metallic molybdenum, metallic rhenium, tantalum carbide, titanium carbide, and zirconium carbide. Further, the material may also include at least one of boron carbide and graphite (carbon material), and may also include at least one of niobium, hafnium, and vanadium. As this material, glassy carbon (for example, Glassy Carbon (product name, manufactured by Rayho Manufacturing Co., Ltd.)) may be used. Boron nitride may be used as this material. The thermal conductivities of a plurality of materials are shown below.

Metallic rhenium: 48 W/m·K
Boron carbide: 35 W/m·K
Graphite: 80 to 250 W/m·K
Glassy carbon: 5.8 W/m·K The material constituting the intermediate members 2*a* and 2*b* is electrically conductive. From the viewpoint of suppressing the intermediate members 2*a* and 2*b* from excessively heating due to energization, it is preferable that the material constituting the intermediate members 2*a* and 2*b* has a lower electrical resistivity than the material constituting the heaters 5*a* and 5*b*. The electrical resistivity of the material constituting the intermediate members 2*a* and 2*b* is preferably 300 μΩ·m or less, and more preferably 100 μΩ·m or less. Since the electrical resistivity of this material is 300 μΩ·m or less, it is possible to suppress the intermediate members 2*a* and 2*b* from generating excessive heat when energized. Furthermore, the lower limit of the electrical resistivity of this material is, for example, 0.1 μΩ·m, and may be 0.3 μΩ·m or 1.0 μΩ·m. The electrical resistivities of a plurality of materials are shown below.

Metallic rhenium: 0.2 μΩ·m
Graphite: 5 to 15 μΩ·m
Glassy carbon: 42 μΩ·m

The heaters 5*a* and 5*b* are made of a material having high electrical resistivity and generate heat when energized. The electrical resistivity of the material constituting the heaters 5*a* and 5*b* is preferably 500 to 1000 μΩ·m, and more preferably 600 to 900 μΩ·m. When the electrical resistivity of this material is 500 μΩ·m or more, the electron source 1 tends to be able to be heated sufficiently by energization, whereas when the electrical resistivity of this material is 1000 μΩ·m or less, the electron source 1 tends to be able to be sufficiently energized. Examples of materials constituting the heaters 5*a* and 5*b* include pyrolytic graphite and hotpressed carbon. Furthermore, the electrical resistivity (typical value) of pyrolytic graphite is 800 μΩ·m.

It is preferable that the electrical resistivity value $R_H$ of the heaters 5*a* and 5*b* is sufficiently larger than the electrical resistivity value $R_I$ of the intermediate members 2*a* and 2*b*. The ratio ($R_H/R_I$) of the electrical resistivity value $R_H$ of the heaters 5*a* and 5*b* to the electrical resistivity value $R_I$ of the intermediate members 2*a* and 2*b* is, for example, 12 to 20, and may be 13 to 19 or 14 to 18. When this ratio is 12 or more, the temperature of the heaters 5*a* and 5*b* can be sufficiently high when energized, and there is a tendency that deposition of the material constituting the electron source 1 in the vicinity of the heaters 5*a* and 5*b* can be suppressed. On the other hand, when this ratio is 20 or less, the loss of power required to heat the heaters 5*a* and 5*b* tends to be reduced.

The emitter 10 can be manufactured through the following steps. First, the conductive terminals 6*a* and 6*b* are fixed to holes 7*b* and 7*c* of the insulator 7 by, for example, brazing ((a) in FIG. 5). Subsequently, the shielding member 8 is fixed to the insulator 7 with the bolt 14 while the conductive terminals 6*a* and 6*b* pass through holes 8*d* and 8*e* of the insulator 7 ((b) in FIG. 5). Then, the conductive terminals 6*a* and 6*b* are bent so that the tips of the conductive terminals 6*a* and 6*b* move close to each other ((c) in FIG. 5). Thereafter, the electron source 1, the intermediate members 2*a* and 2*b*, and the heaters 5*a* and 5*b* are disposed between the tips of the conductive terminals 6*a* and 6*b*. After adjusting the position of the electron source 1, the Wehnelt electrode 9 is attached, and the emitter 10 shown in FIG. 1 is obtained.

According to the above-described embodiment, it is possible to maintain the reliability of the emission current of the emitter 10 for a sufficiently long period of time. That is, as shown in (a) in FIG. 6, since the shielding member 8 is disposed to cover a part of the surface 7*a* of the insulator 7 (particularly, an annular region R1 that follows the inner surface 9*d* of the Wehnelt electrode 9), it is possible to sufficiently suppress the conductive layer Lc from being continuously formed between the conductive terminals 6*a* and 6*b* and the Wehnelt electrode 9 even when the emitter 10 is used for a long period of time. Therefore, it is possible to maintain a high level of insulation between the conductive terminals 6*a* and 6*b* and the Wehnelt electrode 9. On the other hand, when an emitter 100 without the shielding member 8 shown in (b) in FIG. 6 is used for a long period of time, the conductive layer Lc is continuously formed between the conductive terminals 6*a* and 6*b* and the Wehnelt electrode 9, and the insulation between the conductive terminals 6*a* and 6*b* and the Wehnelt electrode 9 may deteriorate.

Although the embodiment of the disclosure has been described in detail above, the disclosure is not limited to the above-described embodiment. For example, the shielding member may be in the following form. An emitter 20 shown in (a) in FIG. 7 includes an annular shielding member 18. The shielding member 18 selectively covers the annular region R1 that follows the inner surface 9*d* of the Wehnelt electrode 9 in the surface 7*a* of the insulator 7. As shown in (b) in FIG. 7, the shielding member 18 is composed of a raised portion 18*a* which comes into contact with the surface 7*a* of the insulator 7 and a protruding portion 18*b* which has a surface 18*s* exposed to the internal space S. The thickness of the raised portion 18*a* is, for example, 0.5 to 2 mm. In plan view, the protruding portion 18*b* is provided to protrude further to the side than the raised portion 18*a*. A groove (not shown) may be provided in the insulator 7, the shielding member 18 may be fitted to this groove, and the shielding member 18 may be fixed to the insulator 7 by brazing.

An emitter 30 shown in (a) in FIG. 8 includes a pair of shielding members 28 and 29. The pair of shielding members 28 and 29 are both annular and selectively cover two annular regions Ra and Rb that respectively follow the outer surfaces of the conductive terminals 6*a* and 6*b* in the surface 7*a* of the insulator 7. The shielding member 28 is composed of a raised portion 28*a* which comes into contact with the surface 7*a* of the insulator 7 and a protruding portion 28*b* which has a surface 28*s* exposed to the internal space S. The thickness of the raised portion 28*a* is, for example, 0.5 to 2 mm. In plan view, the protruding portion 28*b* is provided to protrude further to the side than the raised portion 28*a*. The configuration of the shielding member 29 may be the same as the shielding member 28. A plurality of holes (not shown) may be provided in the insulator 7, the shielding members 28 and 29 may be respectively fitted into these holes, and the shielding members 28 and 29 may be fitted and fixed to the conductive terminals 6*a* and 6*b*.

In the above-described embodiment, an aspect is shown in which the electron source 1 is sandwiched by the intermediate members 2*a* and 2*b*, but the following aspect may be used. (a) and (b) in FIG. 9 are diagrams showing a first modified example. In the electron source 1 according to this modified example, four side surfaces of the columnar portion are covered with the intermediate member 2. Since four side surfaces of the columnar portion of the electron source 1 are covered with the intermediate member 2, this has the effect of suppressing the diffusion of the evaporated matter from the electron source and of making the electron source 1 uniformly heated. The material of the intermediate member 2 may be the same as that of the intermediate members 2*a* and 2*b* according to the above-described embodiment.

(a) and (b) in FIG. 10 are diagrams showing a second modified example. An intermediate member 3 according to this modified example is composed of a columnar portion 3*a* and a conical portion 3*b*. An opening 4 is provided at the tip of the conical portion 3*b*, and the electron source 1 is inserted into the opening 4. In this modified example, the shape of the electron source 1 is a square prism. The length of the electron source 1 is, for example, 0.1 to 1 mm, and may be 0.2 to 0.6 mm or 0.3 mm. The length of 0.1 mm or more tends to improve handling, and the length of 1 mm or less tends to reduce the risk of cracks. The cross-sectional shape of the electron source 1 is approximately square. The length of the side is, for example, 20 to 300 μm, and may be 50 to 150 μm or 100 μm. The shape of the columnar portion 3*a* of the intermediate member 3 is a square prism. The cross-sectional shape of the columnar portion 3*a* is approximately square. The length of the side is, for example, 0.5 to 2 mm, and may be 0.6 to 1 mm or 0.7 to 0.9 mm. Since the surfaces of the electron source 1 other than the electron emission surface are covered with the intermediate member 3, emission of electrons from the surfaces other than the electron emission surface is suppressed. The material of the intermediate member 3 may be the same as that of the intermediate members 2*a* and 2*b* according to the above-described embodiment.

As shown in (a) and (b) in FIG. 10, in the case of the configuration in which the electron source 1 is embedded in the intermediate member 3 and the surfaces of the electron source 1 other than the electron emission surface are covered with the intermediate member 3, the tip of the electron source 1 may protrude from the opening 9*a* as shown in FIG. 11. In this case, the amount of electrons emitted from the electron source 1 can be increased by applying a positive bias voltage to the electron source 1. On the other hand, since the electron source 1 is embedded in the intermediate member 3, it is possible to suppress the emission of excess electrons from the side surface of the electron source 1. Even in this case, in order to heat the electron source 1, the voltage applied across the pair of conductive terminals 6*a* and 6*b* is, for example, about 1 to 10 V, whereas the voltage applied across the conductive terminals 6*a* and 6*b* and the Wehnelt electrode 9 is, for example, 15 to 1000 V.

(a) and (b) in FIG. 12 are diagrams showing a third modified example. In this modified example, the intermediate members 2*a* and 2*b* are not disposed, and the electron source 1 are directly sandwiched by the heaters 5*a* and 5*b*.

The disclosure includes the following invention.

[1] An emitter including:

an insulator;

a pair of conductive terminals attached to the insulator and spaced apart from each other;

a heater disposed between tips of the pair of conductive terminals and generating heat when energized;

an electron source heated by the heater and made of a first material emitting electrons;

a Wehnelt electrode having an inner surface forming an internal space along with a surface of the insulator, and applying a bias voltage across the Wehnelt electrode and the electron source; and a shielding member covering a part of the surface of the insulator in the internal space.

[2] The emitter according to [1], wherein the shielding member suppresses a conductive layer from being formed continuously between the pair of conductive terminals and the Wehnelt electrode due to solidification of evaporated matter on the surface of the insulator, the evaporated matter being generated in the internal space by heat from the heater.

[3] The emitter according to [1] or [2], wherein the shielding member is spaced apart from the inner surface of the Wehnelt electrode.

[4] The emitter according to any one of [1] to [3], wherein the shielding member is spaced apart from the pair of conductive terminals.

[5] The emitter according to any one of [1] to [4], wherein the shielding member is disposed to cover at least a region along the inner surface of the Wehnelt electrode, of the surface of the insulator.

[6] The emitter according to any one of [1] to [5], wherein the shielding member is disposed to cover at least two regions respectively along the pair of conductive terminals, of the surface of the insulator.

[7] The emitter according to any one of [1] to [6], further including an intermediate member made of a second material having a lower thermal conductivity than the first material, wherein the tips of the pair of conductive terminals hold the electron source via the intermediate member.

[8] A device including the emitter according to any one of [1] to [7].

REFERENCE SIGNS LIST

1: Electron source, 2, 2*a*, 2*b*, 3: Intermediate member, 5*a*, 5*b*: Heater, 6*a*, 6*b*: Conductive terminal, 7: Insulator, 8, 18, 28, 29: Shielding member, 9: Wehnelt electrode, 10, 20, 30: Emitter, R1, Ra, Rb: Region

The invention claimed is:

1. An emitter comprising:

an insulator;

a pair of conductive terminals attached to the insulator and spaced apart from each other;

a heater disposed between tips of the pair of conductive terminals and generating heat when energized;

an electron source heated by the heater and made of a first material emitting electrons;

a Wehnelt electrode having an inner surface forming an internal space along with a surface of the insulator, and applying a bias voltage across the Wehnelt electrode and the electron source; and a shielding member covering a part of the surface of the insulator in the internal space and spaced apart from the inner surface of the Wehnelt electrode and the pair of conductive terminals.

2. The emitter according to claim 1, wherein the shielding member suppresses a conductive layer from being formed continuously between the pair of conductive terminals and the Wehnelt electrode due to solidification of evaporated matter on the surface of the insulator, the evaporated matter being generated in the internal space by heat from the heater.

3. The emitter according to claim 1, wherein the shielding member is disposed to cover at least a region along the inner surface of the Wehnelt electrode, of the surface of the insulator.

4. The emitter according to claim 1, wherein the shielding member is disposed to cover at least two regions respectively along the pair of conductive terminals, of the surface of the insulator.

5. The emitter according to claim 1, further comprising an intermediate member made of a second material having a lower thermal conductivity than the first material, wherein the tips of the pair of conductive terminals hold the electron source via the intermediate member.

6. A device comprising the emitter according to claim 1.

7. The emitter according to claim 1, wherein the shielding member includes a first portion having a circular cross section.

8. The emitter according to claim 7, wherein the shielding member further includes a second portion having a rectangular cross section and contacting the insulator.

* * * * *